US012267185B2

(12) United States Patent
Iyengar

(10) Patent No.: US 12,267,185 B2
(45) Date of Patent: Apr. 1, 2025

(54) METHOD AND APPARATUS FOR ENVIRONMENTAL SENSING

(71) Applicant: Elemental Machines, Inc., Salem, NH (US)

(72) Inventor: Sridhar Iyengar, Salem, NH (US)

(73) Assignee: Elemental Machines, Inc., Cambridge, MA (US)

(*) Notice: Subject to any disclaimer, the term of this patent is extended or adjusted under 35 U.S.C. 154(b) by 0 days.

(21) Appl. No.: 18/203,009

(22) Filed: May 29, 2023

(65) Prior Publication Data

US 2023/0300004 A1    Sep. 21, 2023

Related U.S. Application Data

(63) Continuation of application No. 17/325,731, filed on May 20, 2021, now Pat. No. 11,665,024, which is a continuation of application No. 16/732,844, filed on Jan. 2, 2020, now Pat. No. 11,018,900, which is a continuation of application No. 15/556,045, filed as
(Continued)

(51) Int. Cl.
*H04L 12/64* (2006.01)
*F25D 29/00* (2006.01)
*G08B 21/12* (2006.01)
*G08B 29/00* (2006.01)

(52) U.S. Cl.
CPC ........ *H04L 12/6418* (2013.01); *F25D 29/008* (2013.01); *G08B 21/12* (2013.01); *F25D 2700/02* (2013.01); *F25D 2700/123* (2013.01); *G08B 29/00* (2013.01)

(58) Field of Classification Search
CPC .............. H04L 12/6418; F25D 29/008; F25D 2700/02; F25D 2700/123; G08B 21/12; G08B 29/00
See application file for complete search history.

(56) References Cited

U.S. PATENT DOCUMENTS 10,530,608 B2 *   1/2020   Iyengar .................. F25D 29/008
11,018,900 B2 *   5/2021   Iyengar .................. F25D 29/008
(Continued)

*Primary Examiner* — Afshawn M Towfighi
(74) *Attorney, Agent, or Firm* — Anderson Patent Law Firm LLC

(57) ABSTRACT

A method for verifying an alarm condition in an environmental sensing system includes monitoring data received from environmental sensors; detecting anomalous data received from one of the plurality of environmental sensors; determining the context in which the anomalous data was acquired is consistent with typical usage activities; and providing an alarm condition alert when the determined context is not consistent with typical activities. A system for intelligently monitoring environmental conditions includes environmental sensors configured to monitor first and second environmental conditions and to communicate with an intelligent analysis module. The intelligent analysis module is configured with logic to determine whether anomalous data has been collected by the environmental sensors, to determine the context in which the anomalous data was collected, to determine whether the anomalous data can be attributed to a routine activity, and to provide an alarm condition if the anomalous data cannot be attributed to a routine activity.

16 Claims, 11 Drawing Sheets

Related U.S. Application Data application No. PCT/US2016/021848 on Mar. 10, 2016, now Pat. No. 10,530,608.

(60) Provisional application No. 62/131,162, filed on Mar. 10, 2015.

(56) References Cited

U.S. PATENT DOCUMENTS

| | | | |
|---|---|---|---|
| 2005/0055609 A1* | 3/2005 | Yuan | G05B 23/0235 |
| | | | 714/47.2 |
| 2006/0152355 A1* | 7/2006 | Suenbuel | G08B 25/009 |
| | | | 340/511 |
| 2007/0159326 A1* | 7/2007 | Quist | G01F 23/00 |
| | | | 340/539.26 |
| 2008/0106437 A1* | 5/2008 | Zhang | G08B 17/00 |
| | | | 340/584 |
| 2008/0240245 A1 | 10/2008 | Lee et al. | |
| 2009/0012633 A1 | 1/2009 | Liu et al. | |
| 2009/0273470 A1 | 11/2009 | Sinkevicius et al. | |
| 2010/0207762 A1* | 8/2010 | Lee | G06V 20/52 |
| | | | 340/541 |
| 2011/0119100 A1* | 5/2011 | Ruhl | G06F 16/958 |
| | | | 705/7.11 |
| 2013/0014706 A1 | 1/2013 | Menkes | |
| 2014/0258883 A1 | 9/2014 | Duarte et al. | |
| 2015/0097681 A1* | 4/2015 | Fadell | H04L 12/2803 |
| | | | 340/628 |
| 2016/0020891 A1* | 1/2016 | Jung | H04L 5/0064 |
| | | | 370/280 |
| 2021/0028814 A1* | 1/2021 | Lee | H04B 1/123 |

\* cited by examiner

METHOD AND APPARATUS FOR ENVIRONMENTAL SENSING

CROSS REFERENCE TO RELATED APPLICATIONS

This application claims priority to U.S. Provisional Patent Application No. 62/131,162, filed Mar. 10, 2015, and entitled "METHOD AND APPARATUS FOR ENVIRONMENTAL SENSING," which is incorporated herein by reference in its entirety and for all purposes.

BACKGROUND

Monitoring environmental conditions such as temperature, humidity, air pressure, light, motion, gas levels, VOC levels, and sound is important and useful in a number of applications and situations, especially in settings such as scientific laboratories, clinical and medical settings, manufacturing plants, and warehouses. In addition to monitoring ambient conditions in entire rooms, it is also useful to monitor such parameters in smaller spaces such as inside refrigerators, freezers, incubators, storage boxes, fume hoods, and the like. Many sensors that are used to measure environmental parameters are designed to measure a single environmental parameter, such as temperature or humidity. Some monitoring systems can be configured to set off an alarm when a sensor's reading crosses a given threshold or falls outside of the limits of some normal operating range. However, these systems provide no insight as to why the alarm condition was reached. For example, many existing temperature sensors are configured to raise an alarm or send an alert if the temperature crosses, or transgresses, a given threshold without taking into account factors such as the duration of the time outside the desired limits and the extent to which the temperature has changed beyond a threshold limit. Some temperature sensors are equipped with more intelligence so that minor transgressions, for example, in duration and extent of temperature change, do not trigger an alarm condition. However, since these alerting and alarm systems generally rely on a single type of environmental sensor, e.g., a temperature sensor, they are not able to determine the context in which a transgression may have occurred. It is preferable to be able to determine more information about why a transgression has occurred and more preferable to be able to predict that a transgression is likely to happen in the future, and further more preferable to be able to predict when a transgression is likely to happen. The ability to predict such events can be improved when data from multiple sensors, multiple types of sensors, and multiple sensors of multiple types are combined.

Because existing sensor systems provide no contextual information, if the alarm is a true alarm, it is often received too late to take appropriate action to address the failure. Further, no information is provided to distinguish false alarms from true alarms, or true alarms that are unnecessary or premature because conditions are corrected within an acceptable period of time. Thus, there exists a need for more intelligent sensor systems that can discriminate between fluctuations in environmental parameters due to normal usage and activity and those due to abnormal events, and reduces premature and false or unnecessary alarms. There is also a need for systems that can predict when an environmental parameter will likely go outside of desired limits and advise a user of a timeframe in which this is expected to occur, so that corrective action can be taken.

SUMMARY

In some embodiments, a method for verifying an alarm condition in an environmental sensing system includes monitoring data received from a plurality of environmental sensors, detecting anomalous data received from one of the plurality of environmental sensors, determining, using the data received from the other(s) of the plurality of environmental sensors, whether the context in which the anomalous data was acquired is consistent with typical usage activities, and providing an alarm condition alert when the determined context is not consistent with typical activities. In some embodiments, the method includes predicting whether the anomalous data is anticipated to exceed defined thresholds, and providing an alarm condition alert when the anomalous data is anticipated to cross defined thresholds; and/or estimating when the anomalous data is anticipated to cross defined thresholds, and communicating the estimated time at which the thresholds will be crossed. In some embodiments, determining the context in which the anomalous data was acquired includes monitoring patterns of activity over time to determine normal usage patterns. In some embodiments, when the determined context is consistent with typical usage activities, the method also includes continuing monitoring data received from the one of the plurality of environmental sensors; and generating an alarm condition alert if the anomaly is not resolved within the defined period of time. The plurality of environmental sensors may include a temperature sensor, a light sensor, a humidity sensor, and/or a motion sensor.

In some embodiments, a system for intelligently monitoring environmental conditions includes an environmental sensor configured to monitor a first environmental condition and configured to communicate with an intelligent analysis module, an environmental sensor configured to monitor a second environmental condition and to configured to communicate with the intelligent analysis module, and the intelligent analysis module is configured to communicate with the environmental sensors and configured with logic to determine whether anomalous data has been collected by either of the environmental sensors, to determine the context in which the anomalous data has been collected, to determine whether the anomalous data can be attributed to a routine activity and, if the anomalous data cannot be attributed to a routine activity, providing an alarm condition. In some implementations, the system is configured to provide the determined contextual information to a user.

DETAILED DESCRIPTION

Figure 1A:
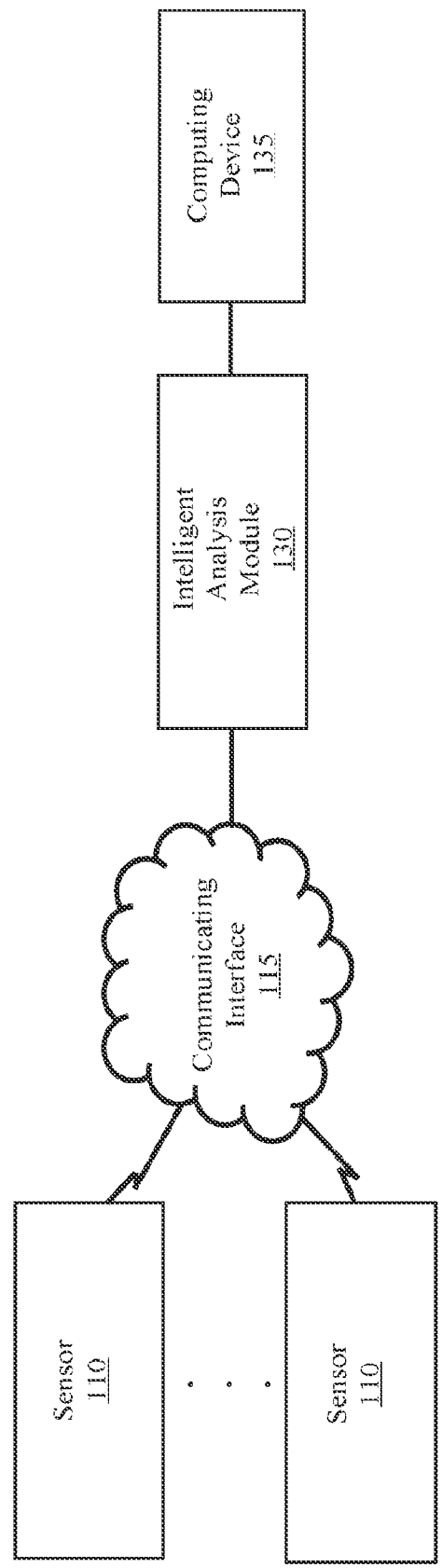
FIGS. 1A and 1B illustrate high-level system architecture of systems for environmental sensing in accordance with aspects of the disclosure.

The use of multiple sensors coupled with models to describe expected behavior in a given environment can improve the reliability of monitoring environmental sensors. Sensors to measure different environmental parameters can be used to monitor a given environment. Such sensors include, but are not limited to sensors that monitor light, temperature, motion, gas, pathogen(s), particles, airborne molecular contamination, pressure, altitude, air pressure, one or more radio frequencies, voltage, current, humidity, flow rate, acoustics, radiation, absolute and/or relative position, water quality, atmospheric pressure, orientation, weight and/or mass, and sensors that monitor any combination of parameters including, but not limited to, those mentioned herein.

It should be appreciated that the aforementioned sensors can be constructed in a variety of ways and in various combinations. For example, a motion sensor can be constructed using different hardware including, but not limited to, an accelerometer that physically moves in response to a motion stimulus (such as how a pedometer device operates to track a person's steps as they walk), an infrared sensor that monitors the motion of objects at a distance without being moved itself (such as how some home security motion alarms operate), or a position sensor such as GPS that monitors position over time. Combining the measurements from multiple sensors, including multiple sensors of the same type and/or multiple sensors of different types, provides a more complete picture of the activity in an environment. Algorithms and rules are defined to describe how the measurements from different sensors should be analyzed to increase the reliability of the monitoring system. False positives, premature positives, and false negatives are reduced by taking into account the context in which the sensor measurements occur.

Disclosed herein are methods and systems for verifying alarm conditions resulting from the monitoring of environmental sensors. Historically, environmental sensing and monitoring have not been widely performed in the context of how the environment is interacted with. Instead, dedicated sensors have been used to individually monitor single environmental parameters such as temperature, humidity, motion, etc. However, the fluctuation and variation of a single environmental parameter may depend upon on how things (people, animals, plants, machines, etc.) interact with the environment being monitored, and often is correlated with fluctuations and variations in other environmental parameters, as well. For example, the presence of people can affect the temperature, humidity, noise, and oxygen levels in a given environment. Thus, monitoring multiple environmental parameters at the same time provides insight as to why one or more of the environmental parameters are fluctuating.

In some situations, it is important to know the cause of or reason for the alarm. Influencing a controlled environment, for example by opening the door of a refrigerator, incubator, or freezer, could cause a temperature sensor's reading to fall for a relatively short period of time while an object is being removed from the controlled environment. This is of particular importance, for example, in the case where temperature must by tightly controlled for the storage of highly temperature sensitive materials. However, monitoring only temperature provides no information as to why the temperature dropped. Further, when the controlled environment is influenced for only a short time in the context of routine or typical activity, there is no need to provide an alarm condition, as long as the controlled environment returns to defined conditions within a defined period of time. However, if the temperature within that controlled environment were to change unexpectedly, for example, because of an unexpected endothermic/exothermic reaction resulting from accidental contact with a reactive chemical compound, this temperature change would not be consistent with typical activity, and it would be important for a user to be alerted to this change in temperature. Further, it would be beneficial for a user to be advised if the temperature were expected to exceed defined thresholds that may result in deleterious effects on one or more items contained within the controlled environment. Still further, it would be beneficial for a user to be advised of when defined thresholds would be breached so that corrective action may be taken, and breach of the thresholds can be avoided. In some settings, such as a laboratory environment, such advance alerts can help to conserve resources by reducing the need to repeat procedures, experiments, and the like because of the occurrence of unfavorable environmental conditions.

The monitoring of environmental sensors also provides valuable information outside of a laboratory. For example, in an agricultural setting, a combination of acoustic (sound) sensors and air quality sensors in a dairy pasture may be used to determine that a pattern of poor air quality and significant noise from heavy equipment corresponds to road construction adjacent to the pasture. Further analysis may reveal that, on days that road construction occurs, milk production decreases. As a result of this information, the cows can proactively be moved to another pasture on construction days, so that milk production is not compromised.

In one implementation, a system in accordance with the present invention can determined whether the temperature inside an environmentally-controlled or environmentally-monitored space falls outside of desired limits due to an actual reportable event, such as a power failure detected via a current sensor or a door to the area not closing properly detected via motion and/or light sensors, or due to typical activities such as someone opening and closing a door to access contents in the area. Examples of such environmentally-controlled or environmentally-monitored spaces include incubators, ovens, clean rooms, incubation rooms, laboratory rooms, freezers, refrigerators, walk-in refrigerators, walk-in freezers, greenhouses, fume hoods, and the like. In such spaces, it is preferable to always keep the temperature within the desired limits. However, short term temperature fluctuations outside of the limits may be acceptable without compromising the quality and integrity of the contents within the spaces.

In order to better estimate and predict the state of an environment, multiple sensors that measure different environmental parameters can be combined with models that reflect normal or typical activity to determine when abnormal use case scenarios occur, and to provide context for those abnormal use case scenarios. Thus, a system in accordance with aspects of the disclosure can determine if anomalous data from one or more environmental sensors is a real and reportable event (a true alarm condition) and provide context for that event, determine if the anomalous result is the result of routine activity or typical activity where the system returns to normalcy within an acceptable, defined period of time (a premature positive), or determine if the anomalous result is the result of noise or sensor failure (a false positive). There are many well-known approaches to addressing the issue of noise in a measurement system, such as filtering and time averaging. A disadvantage of such approaches is that they can incorrectly ignore some events that should trigger an alert (a false negative). Also, since filtering and averaging rely on calculations based on data collected over a period of time, there can be delays associated with determining if a threshold has been crossed or not. In the context of the present disclosure, noise or sensor failure is addressed by utilizing multiple sensors of the same type.

Figure 1B:
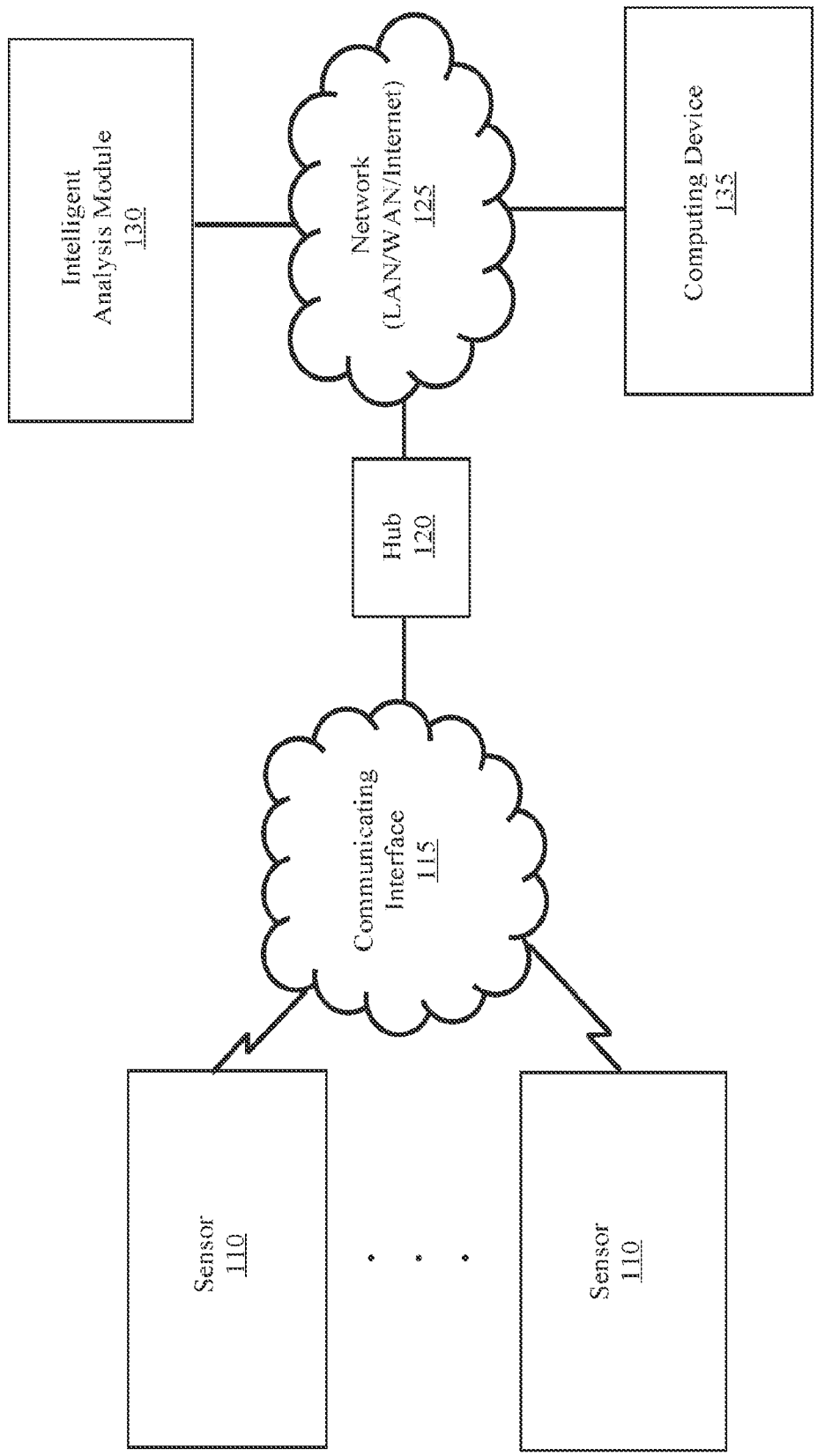

FIGS. 1A and 1B illustrate high-level system architecture of systems for environmental sensing in accordance with aspects of the disclosure. At least two sensors 110 are in communication with communication interface 115 which transmits data from the sensors 110 to an intelligent analysis module 130. In FIG. 1A, data can be transmitted directly to intelligent analysis module 130 via a wired or wireless communication protocol, or a combination therefor. For example, one sensor 110 may be configured to transmit data via a wired Ethernet connection, while the second sensor 110 may be configured to transmit data wirelessly via an IEEE 802.11-based protocol. The communication protocols used between to transmit data from the sensors may be varied without departing from the scope of the invention and include, without limitation, any wired or wireless networking protocols such as TCP/IP, the aforementioned IEEE 802.11-based protocols, cellular communication protocols such as LTE, HSDOA, GPRS, and EVDO, Bluetooth, 60 GHz Protocols such as WirelessHD and WiGig, Rubee, RFID, Wireless Home Automation Protocols including, but not limited to, Insteon, Z-Wave, Zigbee, and BLE, near field communication (NFC), satellite transmission, and the like.

In FIG. 1B, data is transferred from sensors 110 to a hub 120, which collects the data and transmits it to intelligent analysis module 130 via a network 125, such as a local area network (LAN), a wide area network (WAN), or the Internet. The implementation illustrated in FIG. 1B allows for the intelligent analysis module 130 to be remotely located relative to the sensors 110, and a single intelligent analysis module 130 can analyze data for any sensors or groups of sensors that can be connected with it via a network. Thus, in a large-scale, enterprise-type application, for example monitoring conditions pertaining to perishable goods in grocery warehouses nation-wide, a cloud-based model may be used to analyze data collected nation-wide. Computing device 135 may be any computing device including, but not limited to, a personal computer, laptop computer, smart phone, personal digital assistant, etc., and may be used to provide inputs to the intelligent analysis module as required, and may be configured to receive alarm condition alerts via a network or the Internet when provided by the intelligent analysis module.

Figure 2:
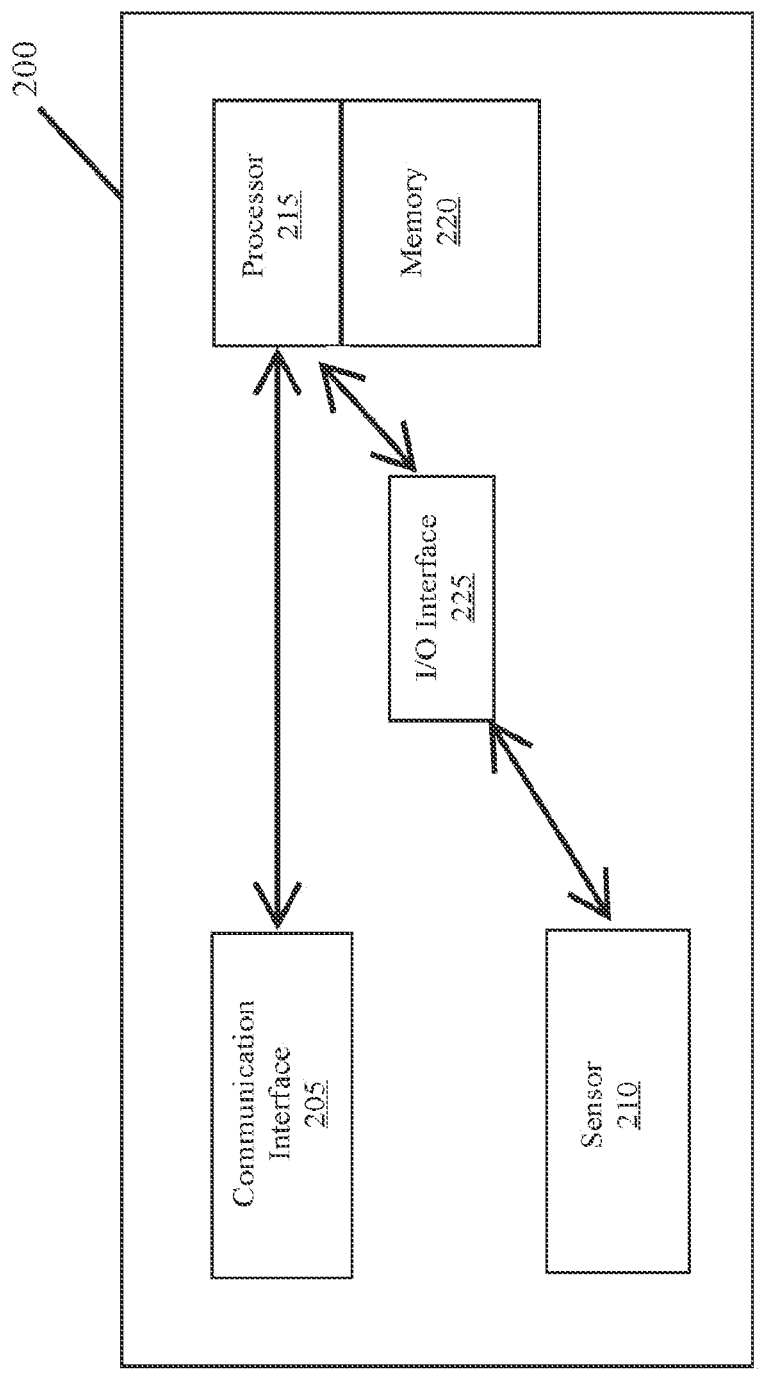
FIG. 2 illustrates an exemplary sensor device in accordance with aspects of the disclosure.

FIG. 2 illustrates an exemplary sensor assembly 200 in accordance with aspects of the disclosure. A "sensor" as referred to herein should be construed to include not only sensor hardware/software 210, but a processor 215, memory 220, an i/o interface 225 connecting the sensor and processor 215, and a communications interface 205 that allows at least the transmission of data from the sensor assembly to other hardware. The sensor assembly 200 should also include sufficient power, whether hardwired or powered via battery or a renewable energy source such as solar or wind generated power, to power the sensor hardware/software and for communication. Memory 220 stores both instructions for execution by processor 215 and at least temporarily stores data acquired by sensor 210, and may be any non-transitory storage medium including, but not limited to, RAM, ROM, EEPROM, solid state storage, magnetic disk, removable storage media, or the like. Further, the term processor as used herein may refer to any processor or combination of processors including, but not limited to, microprocessors, microcontrollers, application specific integrated circuits (ASICs), programmable logic circuits, digital signal processing (DSP), and the like.

Figure 3:
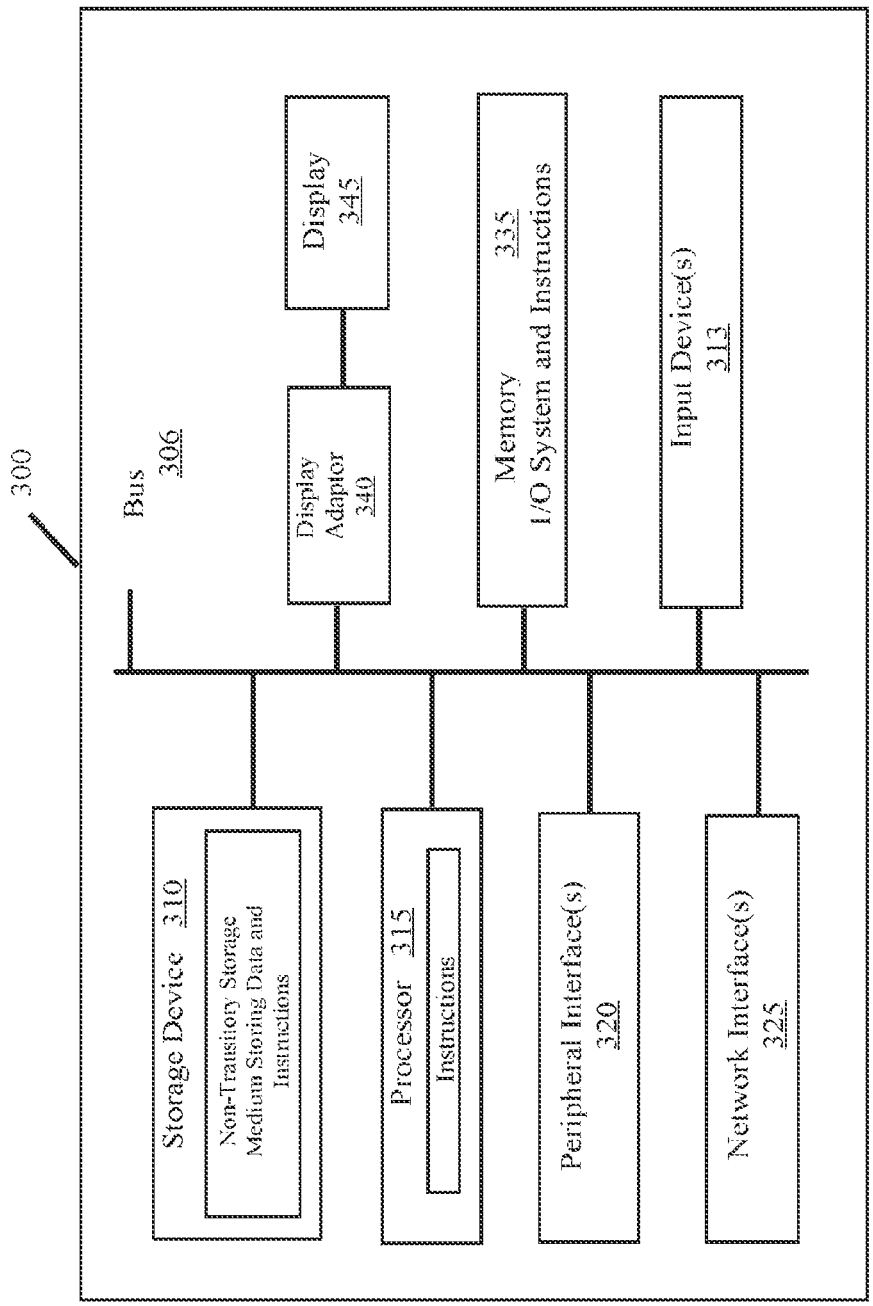
FIG. 3 illustrates an exemplary hardware implementation for an intelligent analysis module in accordance with aspects of the disclosure.

FIG. 3 illustrates an exemplary hardware implementation for an intelligent analysis module in accordance with aspects of the disclosure. Similar to the sensor assembly 200, intelligent analysis module 300 includes memory in the form of non-transitory computer-readable storage for storing both data and instructions for performing logic operations on said data, and a processor 315 for executing the stored instructions.

Figure 4:
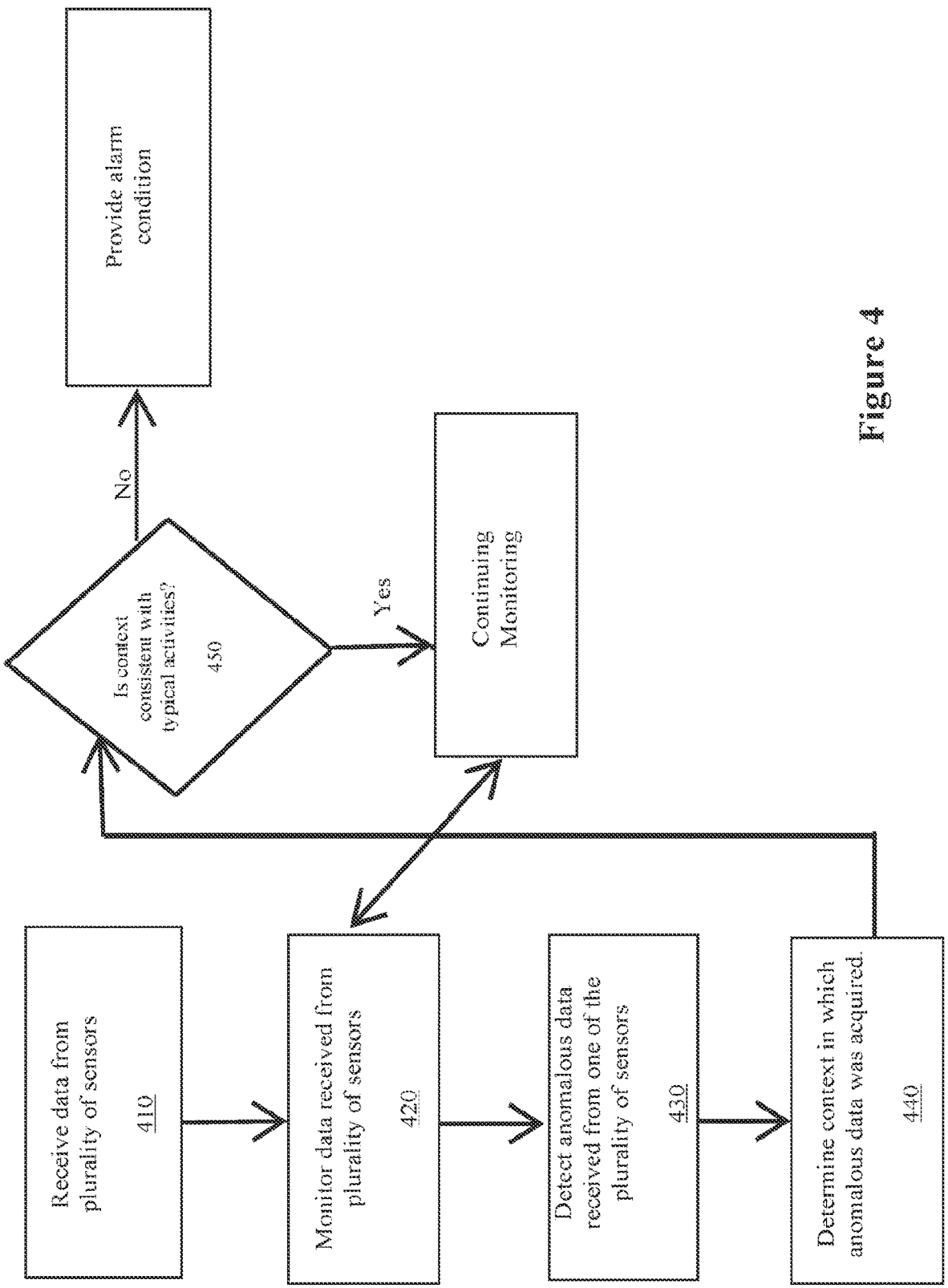
FIG. 4 illustrates a flow chart for determining that an alarm condition exists, in accordance with aspects of the disclosure.

FIG. 4 illustrates a flow chart for determining that an alarm condition exists, in accordance with aspects of the disclosure. Instructions for performing this process are stored in the memory of the intelligent analysis module, and executed by the processor of the intelligent analysis module. Data is received from the plurality of environmental sensors in operation 410, and monitored in operation 420. In operation 430, one or more anomalies are detected in data from one of the plurality of environmental sensors. Anomalies may be specific parameters defined by a user, or may be fluctuations in data that do not fit the defined or anticipated pattern of data. In a non-limiting example, in the case of a temperature sensor, if the temperature is expected to be constant (within a tolerance), but the data received from the temperature sensor indicates that the temperature is fluctuating, anomalous data would be detected in operation 430.

In operation 440, data from the other sensors of the plurality of sensors is analyzed to determine the context in which the anomalous data was collected. The determination of context may be made using user-defined factors, by detecting patterns in the data from the others of the plurality of sensors, and/or by using adaptive algorithms to identify events in the data of the others of the plurality of sensors which provides at least some insight into what occurred in the environment with respect to one or more other environmental sensors when the anomalous data was detected. In operation 450, it is determined whether the context determined is a typical or routine activity. Typical or routine activities are identifiable because they are repeatable (generally identifiable by pattern of data), and the sensor readings generally return to normal within a short or predefined period of time. If the anomalous reading can be attributed to or associated with a typical or routine activity, the anomalous data can be disregarded (no cause for alarm condition), so long as the data returns to expected values within a predefined acceptable period of time. If the anomalous data can not be associated with a typical or routine activity, an alarm condition is provided because something unexpected has occurred with respect to the data. An alarm condition can be provided locally on a locally connected or networked computing device, or communicated via e-mail or SMS or other messaging protocol to provide for remote monitoring capability.

In some implementations, when an alarm condition is provided, further logic may be applied to determine whether or not the anomalous data is expected to continue, and whether it is expected to exceed pre-defined boundaries or thresholds. In some implementations, modeling techniques such as linear regression using a least squares approach, linear extrapolation, exponential functions, logarithmic functions, error functions, polynomial functions, and sigmoid functions may be applied to the data to predict when a pre-defined threshold value will be exceed, and advance notice can be provided to a user via known messaging protocols. Thus, a user may have an opportunity to intervene before boundary conditions are exceeded or crossed.

While temperature and light sensors are described herein for exemplary purposes, any combination of environmental sensors could be used without departing from the scope of the invention. In the example of a walk-in refrigeration unit, multiple sensors may be set up to capture multiple parameters. A light sensor can be installed inside the unit so that when the door is opened, a change in the amount of light can be measured. If the change in the amount of light is greater than a specified threshold, then an alert can be generated. It should be appreciated that the amount of light, or indeed a change in the amount of light, can be measured by many methods and can be described by different quantities such as lumens, lux, candela, and the like. A light sensor can be a sensor that is responsive to electromagnetic radiation including, but not limited to, wavelengths in the visible spectrum, infrared radiation, and ultraviolet light. It should be appreciated that other wavelengths of electromagnetic radiation, such as radio waves, can also be measured by appropriate sensors.

Multiple light sensors can be installed, and the data from these multiple sensors can be combined for analysis. For simplicity, "light sensor" shall refer to a system that includes at least one sensor configured to detect light, and "temperature sensor" shall refer to a system that includes at least one sensor configured to detect temperature. It should be appreciated that, in some implementations, multiple sensors of the same type and/or multiple sensors of different types may be co-located, for example, within the same housing or equipment. If a temperature sensor, or a set of multiple temperature sensors, detects that the temperature inside the unit begins to change and move towards a defined threshold boundary, and a light sensing system also detects a change in the measured light, then one possible contextual explanation for the temperature change is that the door of the unit has been opened. The following examples illustrate scenarios where multi-sensor measurements are useful. It should be appreciated actual temperature and light readings may be different depending on many factors including, but not limited to, sensor location and placement within the unit, the sensitivity of sensors, measurement range, and the like. It should also appreciated that, in some implementations, the intelligent analysis module may be co-located with one or more sensors.

Figure 5:
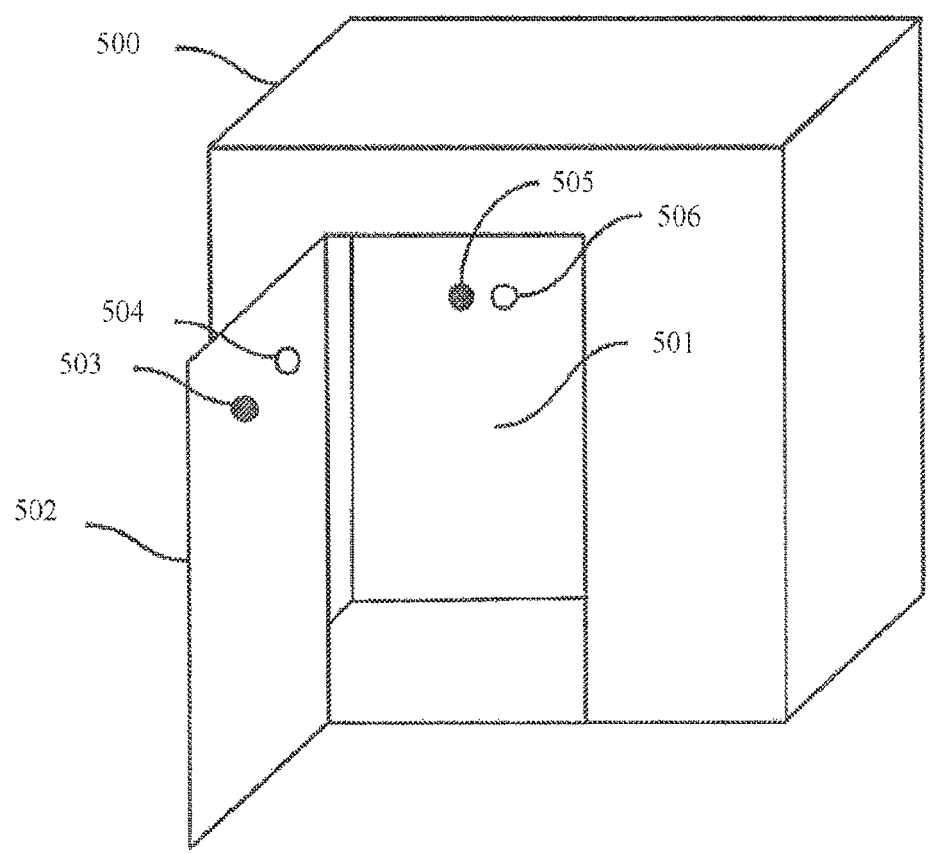
FIG. 5 illustrates the placement of sensors in an environmentally controlled space in accordance with aspects of the disclosure.

FIG. 5 illustrates an exemplary setting using a typical walk-in refrigeration unit 500, which is a non-limiting example of an environmentally-controlled space. Walk-in refrigeration unit 500 includes a door 502 that can be opened and closed to provide access to the interior space 501. Exemplary placements of temperature sensors 503, 505 and light sensors 504, 506 are shown. As shown, light sensor 504 and temperature sensor 503 are located on the interior face of door 502. Light sensor 506 and temperature sensor 505 are located on an interior wall of refrigeration unit 500. It should be appreciated that it is preferable to place a light sensor in a location where it can monitor light entering the space from the door opening, and that different placement locations of light sensors and temperature sensors can affect the quality and reliability of sensor readings without departing from the scope of the invention.

Four exemplary scenarios are provided herein, demonstrating how a user can benefit from a multiple-sensor detection system by the simultaneous use of light and temperature sensors. It is to be appreciated that these are illustrative examples and do not limit the scope of the invention. Sensors that measure other environmental parameters may be used in combination with light and/or temperature sensors, or in place of light and/or temperature sensors, and environments may be monitored for the environmental parameters detected by those other environmental sensors, as well. It should be appreciated that the logic for determining whether anomalous data exists, for determining context, and for determining whether context is typical or routine varies depending on the sensors used to gather data.

Exemplary Scenario 1: Opening and Closing of Refrigeration Unit Door

Figure 6:
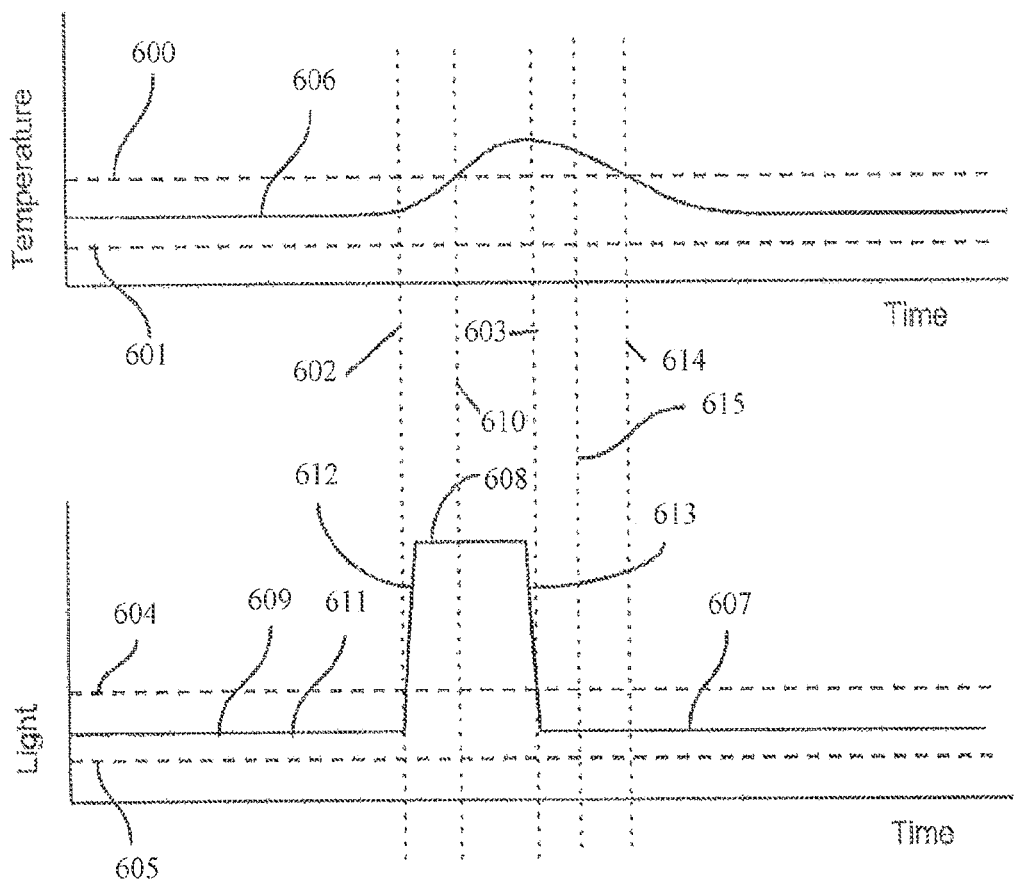
FIGS. 6-9 illustrate exemplary changes in temperature and light over time, in accordance with aspects of the disclosure.

FIG. 6 illustrates exemplary changes in temperature and light over time, in accordance with aspects of the disclosure. Specifically, FIG. 6 illustrates the changes in light and temperature in a refrigeration unit, such as refrigeration unit 500, over time. Temperature sensor reading 606 and light sensor reading 609 are illustrated as a function of time. Pre-defined threshold 600 is one boundary limit for temperature and pre-defined threshold 601 is a second boundary limit for temperature. Pre-defined threshold 604 is one boundary limit for light and pre-defined threshold 605 is a second boundary limit for light. Light sensor reading 109 has five sections that correspond to a first light level region 611, a second light level region 608, a third light level region 607, a first transition region 112 and second transition region 113.

At time 102, logic in the intelligent analysis module detects that the light level has crossed threshold 104 and continues to light level 108. At approximately the same time, the temperature sensor records temperature level 106 rising from a relatively stable baseline value. At time 110, the temperature crosses threshold 100. At time 103, the light level crosses threshold 104 to return back within the threshold limits 104 and 105. At time 114, the temperature level also drops down to return between desired threshold levels 100 and 101.

Logic in the intelligent analysis module determines that the light level returned back to its nominal baseline level at time 103, thereby providing contextual information that the door was likely opened at approximately time 102, and closed at approximately time 103. This pattern of data is consistent with the routine activity of opening the door of the refrigeration unit. The alerting algorithm determines that, because this is a routine activity, there is no need for premature alarm. The temperature would be expected to return back to the desired range within a short while, thereby avoiding the triggering of a premature alarm. In some implementations, the alerting algorithm checks again at one or more later points in time to confirm that the temperature did indeed return back to the desired range. An alert can subsequently be sent if the temperature does not return to the desired range.

Exemplary Scenario 2: Quick Opening and Closing of Refrigeration Unit Door

Figure 7:
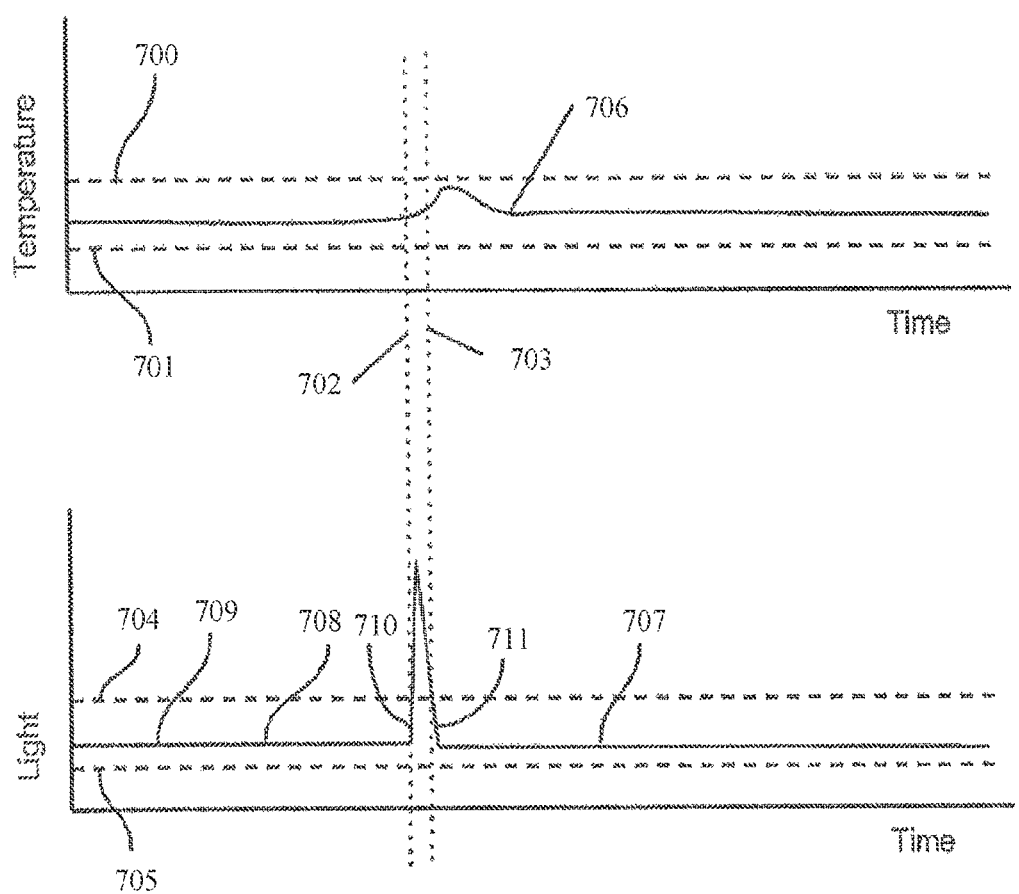

FIG. 7 illustrates another example scenario of how temperature in a refrigeration unit can change over time. Temperature sensor reading 706 and light sensor reading 709 are shown as a function of time. Threshold 700 is one boundary limit for temperature and threshold 701 is a second boundary limit for temperature. Threshold 704 is one boundary limit for light and threshold 705 is a second boundary limit for light. Light sensor reading 709 has four sections that correspond to a first light level region 708, a first transition region 710 and second transition region 711, and a second light level region 707 that corresponds to approximately the same light level value at region 708.

This example scenario represents a situation where the door is quickly opened approximately at time 702 and closed at time 703. The temperature 706 rises slightly between time 702 and 703 but does not cross threshold 700. However, it is beneficial to understand that the temporary rise in temperature 706 between time 702 and time 703 was due to a recognizable, attributable activity (such as a door opening and closing, as indicated by the light level changing in regions 710 and 711) that is detectable by logic in the intelligent analysis module, and not due to some other undiagnosed malfunction of the refrigeration unit.

Figure 8:
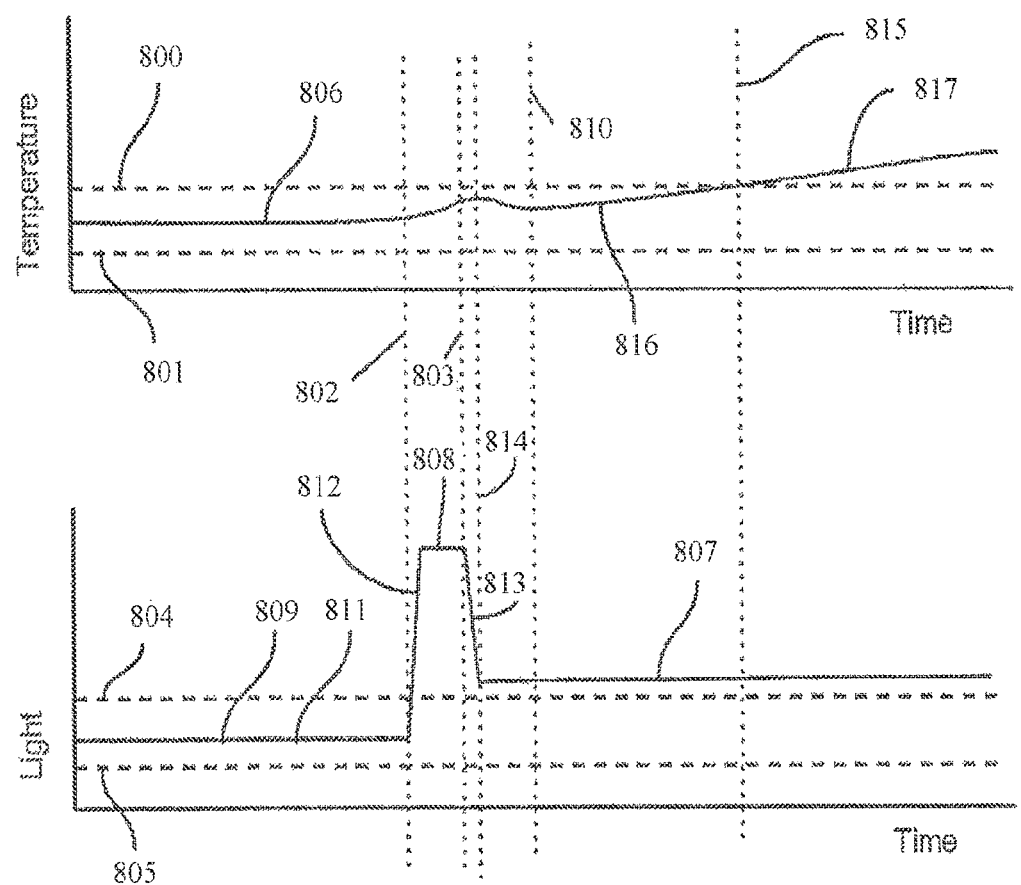

FIG. 8 illustrates another example scenario of how temperature in the refrigeration unit can change over time when the door is not fully closed. Temperature sensor reading 806 and light sensor reading 809 are shown as a function of time. Threshold 800 is one boundary limit for temperature and threshold 801 is a second boundary limit for temperature. Threshold 804 is one boundary limit for light and threshold 805 is a second boundary limit for light. Light sensor reading 809 has five sections that correspond to one light level region 811, a second light level region 808, a third light level region 807, a first transition region 812 and second transition region 813.

At time 802, logic in the intelligent analysis module detects that the light level has crossed threshold 804 and continues to light level 808. At approximately the same time, the temperature sensor records temperature level 806 rising from a relatively stable baseline value. At approximately time 803, the light level falls toward threshold 804 but does not return back within the threshold limits 804 and 805; instead, it returns to light level 807 that is slightly higher than threshold 804 but is less than its previous level of 808. The temperature drops slightly between time 814 and time 810, and then it gradually increases after approximately time 810 (section 816) and ultimately crosses threshold 800 at approximately time 815 (section 817).

In this scenario, the gradual temperature rise 816 may not be detected until threshold 800 is crossed by simple temperature monitoring systems that just rely on measuring the temperature alone. However, by monitoring the light sensor as well, it is clear that the door was opened for a period of time between time 802 and time 803, but that by time 814, the door did not fully close, thereby allowing some level of external light into the unit. Thus, logic in the intelligent analysis module would interpret the rising temperature signal 816 in combination with increased light level 807 above threshold 804 as resulting from the door not being fully closed, which is not a typical activity for a refrigeration unit. Furthermore, taking into account light level 808 prior to light level 807, logic in the intelligent analysis module could further deduce that a user more fully opened the door and that the door did not fully close after use. With this information, logic in the intelligent analysis module can conclude that, since the door is not fully closed, the temperature will continue to rise to a new higher level. Based on the rate of increase of the temperature 816, it would be possible to estimate when the temperature level will cross threshold 800, and provide advance notice to the user of this estimate.

The ability to estimate when in the future the temperature inside the unit will cross a threshold level is important and useful. By triggering an alarm or alert a period of time before the temperature is expected to cross a threshold level, a notified user can intervene to investigate the cause of the temperature rise and take action to fix the cause of the unwanted temperature rise, or take other action to reduce the impact of the temperature rise, such as moving the contents of the compromised unit to another functional unit.

In the example of FIG. 8, the temperature is rising in an approximate linear fashion from time 810. One method of estimating the time at which the temperature will cross threshold 800 is to use a linear equation as follows:

$Temp(t)$=Temperature Sensor Reading at time $t$(shown by line 806)

Threshold1=Upper Temperature Threshold Level (shown by dashed line 800)

Threshold2=Lower Temperature Threshold Level (shown by dashed line 801)

$t$Rise=time 310 when temperature starts to increase $t$crossing=estimated time at which the temperature will cross threshold 300

$K$=slope of temperature versus time data estimated from data in region 316

$Temp(t) = K*(t - tRise) + Temp(tRise)$ so for: $t$=tcrossingTemp $(tcrossing)$=Threshold1 so: $Temp(tcrossing) = K*(tcrossing - tRise) + Temp(tRise)$ thus:

$Threshold1 = K*(tcrossing - tRise) + Temp(tRise)$ $tcrossing = (Threshold1 - Temp(tRise))/K + tRise$ It may be necessary to estimate the value of K to perform the above calculations.

There are many well-known techniques to estimate a slope from given data, such as linear regression using a least squares approach. The above example can be better illustrated with a numerical example with the following assumptions:

$Temp(t)$=Temperature Sensor Reading at time $t$(shown by line 306)

Threshold1=−10 C

Threshold2=−15 C $t$Rise=3:00 AM

Temp (3:00 AM)=−12

$Ct$crossing=estimated time at which the temperature will cross threshold 300

$K$=0.1 C/min $tcrossing = ((-10\ C) - (-12\ C))/(0.1\ C/min) + 3:00\ AM$ $tcrossing = (2\ C)/(0.1\ C/min) + 3:00\ AM$ tcrossing=20 min+3:00 AM tcrossing=3:20 AM Thus, the intelligent analysis module can send an alert to a user via email, SMS, or any other messaging protocol, to indicate that the temperature is estimated to cross the upper threshold limit 300 at approximately 3:20 AM before that time has been reached.

It should be appreciated that a linear extrapolation model is only one of many possible forms of equation for modeling and predicting a future value of temperature and/or the time in the future when the temperature is expected to reach a particular level based on current and previous values. Other forms include exponential functions, logarithmic functions, error functions, polynomial functions, and sigmoid functions.

One method of estimating if and/or when the temperature will go outside of the desired limits is to fit a regression line to data that has occurred in the immediate past, for example the last 15 or 30 minutes. For example, one can use a linear regression. This would result in a gradient describing the change in temperature over time (for example, 0.2 C/min or 1.5° F./sec). One can perform this type of calculation in real time, or at predefined intervals, for example, once every 5 minutes, once every 10 minutes, once every 30 minutes, or once every hour. This calculation can also be performed when sensors pick up increased activity, such as when the door is opened or closed. For situations when a pre-defined model for describing the change in the environmental parameter (in this example, temperature) is not readily available, one can perform statistical analysis on the data, such as computing the mean, median, and standard deviation of the data. A moving average calculation can also be performed, for example a moving average of the previous 5 or 10 minutes. Here are some examples of how the moving average and gradient calculations can be used:

- If the gradient is approximately zero (or the mean value of the gradient over a period of time is approximately zero), then the environmental parameter is expected to approximately maintain its current value.
- If the gradient is less than zero (or the mean value of the gradient over a period of time is less than zero), then the environmental parameter is expected to decrease in value over time.
- If the gradient is greater than zero (or the mean value of the gradient over a period of time is greater than zero), then the environmental parameter is expected to increase in value over time.
- If the moving average and the gradient both continue to increase in value, then the calculation suggests that the environmental parameter will continue to increase.
- If the moving average and the gradient both continue to decrease in value, then the calculation suggests that the environmental parameter will continue to decrease.
- If the gradient is approximately constant and non-zero for a period of time, then a linear approximation can be used to extrapolate when in the future the measured environmental parameter is likely to cross a threshold limit and an alert can be sent to a user with the estimated threshold crossing time.
- If the gradient is increasing with time, then a nonlinear model may be used to approximate the time in the future when the measured environmental parameter is likely to cross a threshold limit and an alert can be sent to a user with the estimated threshold crossing time.
- If both the moving average and the gradient are increasing (or decreasing) with time and moving away from a nominal baseline value towards a threshold limit, then an alert can be sent to notify a user. An alerting or alarm algorithm can further comprise logic to only include valid data points in calculations and disregard invalid data points. Invalid data points can be data points that were measured during known interaction or usage events, such as a user opening a door.

Figure 9:
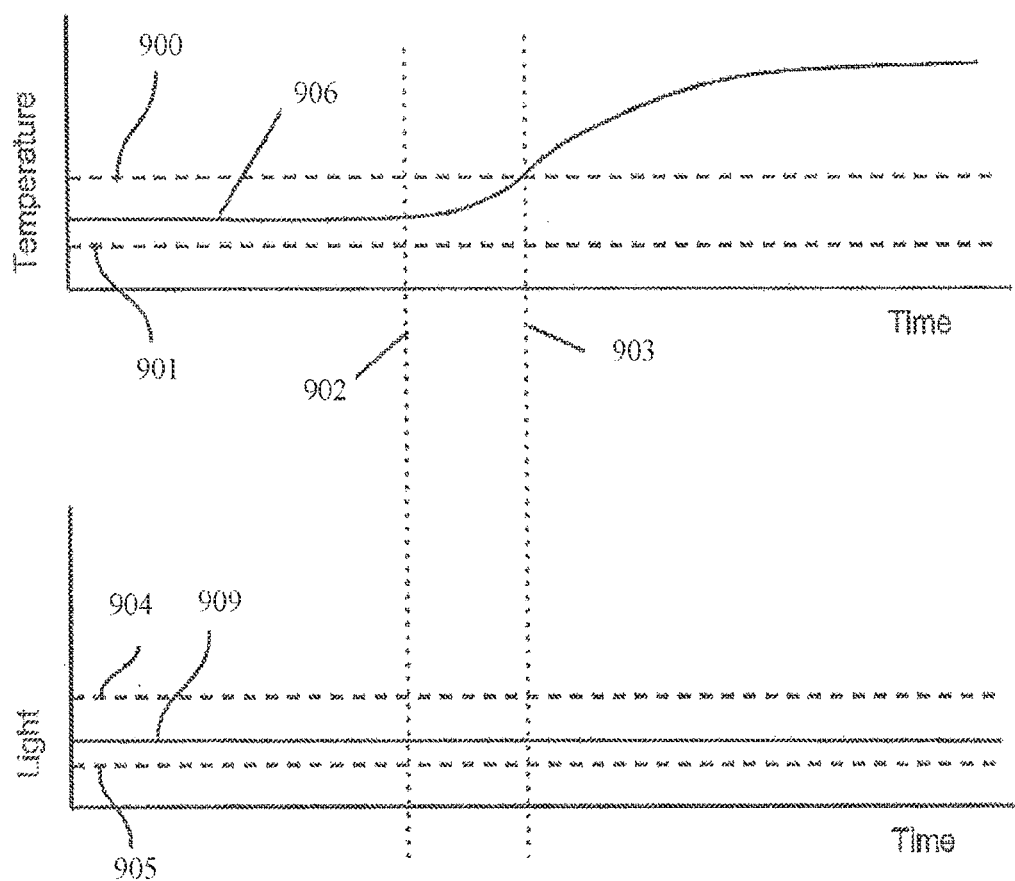

FIG. 9 illustrates another example scenario of how temperature in the refrigeration unit can change over time when a real fault occurs. Temperature sensor reading 906 and light sensor reading 909 are shown as a function of time. Threshold 900 is one boundary limit for temperature and threshold 901 is a second boundary limit for temperature. Threshold 904 is one boundary limit for light and threshold 905 is a second boundary limit for light. Light sensor reading 909 remains constant for the duration of this scenario. At time 902, the temperature 906 begins to increase. At approximately time 903, the temperature crosses threshold 900 and continues to increase.

In this scenario, the light level 909 remains constant, so logic in the intelligent analysis module is not able to determine any contextual information to explain the temperature increase. Thus, the logic in the intelligent analysis module concludes the measured increase in temperature starting from time 902 is likely not due to normal activity such as opening of the door. An alerting algorithm would therefore classify the rising temperature and the crossing of threshold 900 at time 903 as real, alarm-worthy events, rather than a false positive, and send an alert.

Although the above examples relate to temperature and light measurements, one ordinarily skilled in the art will recognize that a similar approach can be used for other types of sensors as well. For example, one can measure the opening and closing of the door using an accelerometer mounted on the door or with a magnetic sensor that monitors when the door is open or closed. It is also possible to monitor motion using motion detectors, similar to ones commonly used in home security systems (such as the Honeywell RCA902N1004/N Wireless Motion Detector, SimpliSafe, and GE Choice Alert). Such motion detectors can detect when the door is opened or closed or when there is activity inside the unit. Acoustic sensors can be used to determine when a door is opened or closed, or when there is activity inside a unit or near an area.

In addition to temperature, it is often desirable to measure other environmental parameters, such as humidity and noise. In these cases, it is possible to monitor additional environmental parameters such as motion and light to determine if the fluctuations in humidity and noise are due to normal expected activity. For example, an increase in humidity in a low-humidity environment such as a manufacturing clean room can be correlated with an increase in motion and/or noise, signifying the presence of people, as is illustrated by the following example.

Figure 10:
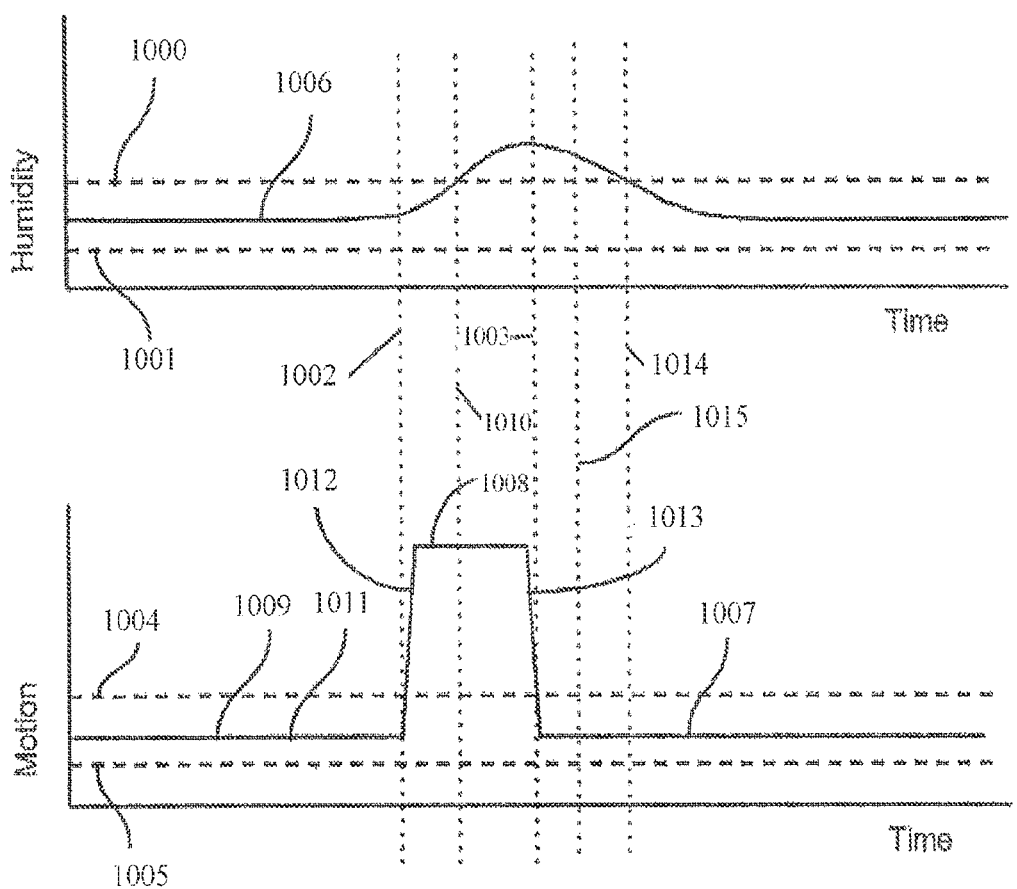
FIG. 10 illustrates exemplary changes in humidity and motion over time, in accordance with aspects of the disclosure.

FIG. 10 illustrates one example scenario of how humidity in the unit can change over time. In this example, a humidity sensor and a motion sensor are placed within a confined space. The motion sensor in this example is one that detects motion within a given space. Humidity sensor reading 1006 and motion sensor reading 1009 are shown as a function of time in FIG. 10. Threshold 1000 is one boundary limit for humidity and threshold 1001 is a second boundary limit for humidity. Threshold 1004 is one boundary limit for motion and threshold 1005 is a second boundary limit for motion. Motion sensor reading 1009 has five sections that correspond to one motion level region 1011, a second motion level region 1008, a third motion level region 1007, a first transition region 1012 and second transition region 1013.

At time 1002, logic in the intelligent analysis module detects that the motion level has crossed threshold 1004 and continues to motion level 1008. At approximately the same time, the humidity sensor records humidity level 1006 rising from a relatively stable baseline value, which is also detected by logic in the intelligent analysis module. At time 1010, the humidity crosses threshold 1000. At time 1003, the motion level crosses threshold 1004 to return back within the threshold limits 1004 and 1005. At time 1014, the humidity level also drops down to return between desired threshold levels 1000 and 1001.

Data from the motion sensor, interpreted by logic in the intelligent analysis module, makes it would be clear that at time 1003 the motion level returned back to its nominal baseline level, thereby indicating that a person entered the space approximately time 1002 and exited at approximately time 1003. Logic in the intelligent analysis module would determine that the door was then closed and that the humidity would be expected to return back to the desired range within a short while, because this is a routine or typical activity, thereby avoiding the triggering of a false alarm. Logic in the intelligent analysis module would check again at a later point in time to confirm that the humidity did indeed return back to the desired range. An alert can subsequently be sent if it the humidity did not return to the desired range.

It can also be appreciated that multiple different types of sensor readings can be analyzed in combination to determine a more representative and reliable state of the environment. For example, a light sensor can be combined with humidity and motion sensors to further indicate events such as opening and closing of a door beyond just the motion sensor's reading being used to determine when a person is inside the unit. Another example is to monitor noise or sound levels. The presence of a person and his/her activity within the unit may create sounds that can be measured by a sound sensor.

Furthermore, more intelligent algorithms can be constructed that take into account information in addition to sensor readings. As is often the case, patterns of usage can vary with certain patterns. For example, it is expected that usage patterns during weekdays (Monday to Friday) will be different than usage patterns on weekends (Saturday and Sunday). Other days of the week such as holidays (e.g. Christmas) are also expected to have different usage patterns than other typical days. Furthermore, different times of the day can also experience different usage patterns: during typical office hours (from 9 am until 5 pm) people will likely interact with the environmental units more frequently than during the night time hours. Such time-based usage patterns can be incorporated into logic in the intelligent analysis module to increase or decrease the sensitivity and alert trigger conditions, and to update routine activity patterns. For example, during regular working hours, the threshold limits for temperature might be widened, but during non-working hours, these limits might be narrowed. One ordinarily skilled in the art will recognize that it is possible to alter the algorithm and the triggering conditions based on time of day and day of the week/month/year to tailor conditions for expected usage patterns.

In some situations, activities in a given environment may not be regular and easily described by time of day or by day of the week/month/year. For such situations, an adaptive algorithm can be used by the logic of the intelligent analysis module, whereby the activity patterns for a previous period of time are used to denote typical or normal usage patterns. For example, a system can be implemented to monitor typical activity behavior patterns such as activity by time of day and by day of week/month/year, frequency of usage and interaction with an environmental unit and the like. This can be seen as a training period for logic in the intelligent analysis module to learn typical patterns of usage and behavior which can serve as a basis for adjusting the sensitivity of an alert or alarm algorithm or the threshold limits.

What is claimed is:

1. A method for predicting an alarm condition, comprising:
   monitoring data received from a plurality of environmental sensors, each of the plurality of environmental sensors providing data relating to a different environmental condition; and
   detecting anomalous data received from a first of the plurality of environmental sensors; wherein:
   when anomalous data is detected from the first of the plurality of environmental sensors triggering an alarm prediction step whereby an expected reading from a second of the plurality of environmental sensors is used to predict whether an alarm condition is likely to occur at a future time; and
   when it is predicted that an alarm condition is likely to occur at a future time, providing a notification or alert message that an alarm condition is expected to occur at a future time.

2. The method according to claim 1, wherein an estimated time for when the alarm condition is expected to occur is determined.

3. The method according to claim 2, wherein the estimated time is included in the notification or alert message.

4. The method according to claim 1, wherein one or more of the plurality of environmental sensors is selected from the group consisting of: a temperature sensor, a light sensor, a humidity sensor, and a motion sensor.

5. The method according to claim 4, wherein the plurality of environmental sensors include a temperature sensor and a light sensor.

6. The method according to claim 4, wherein the plurality of environmental sensors include a humidity sensor and a motion sensor.

7. The method of claim 1, wherein the alarm prediction step comprises comparing data received from the second of the plurality of environmental sensors to the expected reading of the second of the plurality of environmental sensors, wherein a difference between data received and expected reading predicts the alarm condition.

8. The method of claim 1, wherein the first and/or second environmental sensor comprises a motion sensor selected from the group consisting of: an accelerometer that physically moves in response to a motion stimulus; an infrared sensor that monitors the motion of an object at a distance without being moved itself; and a GPS position sensor.

9. A system for predicting an alarm condition, comprising:
   a first environmental sensor configured to monitor a first environmental condition and configured to communicate via a wired or wireless network;
   a second environmental sensor configured to monitor a second environmental condition which is different from the first environmental condition, and configured to communicate via a wired or wireless network;
   and an intelligent analysis module configured to communicate with the first and second sensor and configured with logic to determine whether anomalous data has been collected by the first sensor, if it is determined that anomalous data has been collected by the first sensor to trigger an alarm prediction step to predict if an alarm condition may be reached at a time in the future based on an expected reading of the second sensor, and if it is determined that an alarm condition is likely to be reached at a time in the future to provide a notification or alert message.

10. The system according to claim 9, wherein the intelligent analysis module is configured to determine an estimated time for when the alarm condition is expected to occur.

11. The system according to claim 10, wherein the estimated time is included in the notification or alert message.

12. The system according to claim 9, wherein the first and/or second environmental sensor is selected from the group consisting of: a temperature sensor, a light sensor, a humidity sensor, and a motion sensor.

13. The method according to claim 12, wherein the plurality of environmental sensors include a temperature sensor and a light sensor.

14. The method according to claim 12, wherein the plurality of environmental sensors include a humidity sensor and a motion sensor.

15. The system of claim 9, wherein the alarm prediction step comprises comparing data received from the second sensor to the expected reading of the second sensors, wherein a difference between the data received and the expected reading predicts the alarm condition.

16. The system of claim 9, wherein the first and/or second environmental sensor comprises a motion sensor selected from the group consisting of: an accelerometer that physically moves in response to a motion stimulus; an infrared sensor that monitors the motion of an object at a distance without being moved itself; and a GPS position sensor.

* * * * *